United States Patent [19]

Ankeny et al.

[11] Patent Number: 4,475,124
[45] Date of Patent: Oct. 2, 1984

[54] SYNCHRONIZING SYSTEM FOR CHARACTER DISPLAY

[75] Inventors: Donald Ankeny, Schaumburg; Gary Jones, Arlington Heights, both of Ill.

[73] Assignee: Zenith Electronics Corporation, Glenview, Ill.

[21] Appl. No.: 365,422

[22] Filed: Apr. 5, 1982

[51] Int. Cl.³ .................. H04N 5/22; H04N 5/93
[52] U.S. Cl. .................. 358/183; 358/148; 340/730; 340/814
[58] Field of Search .............. 358/148, 183, 192.1; 340/721, 726, 730, 745, 750, 814

[56] References Cited

U.S. PATENT DOCUMENTS 2,752,422  6/1956  Alexander .................. 358/154
3,993,864  11/1976  Pye et al. .................. 358/183

Primary Examiner—Tommy P. Chin

[57] ABSTRACT

A system is described for synchronizing the display of characters within a character image area on a raster scanned cathode ray tube. The system's input is a composite blanking signal which includes conventional horizontal rate and vertical rate blanking pulses. In response to the composite blanking signal, the system generates a reset signal when the tube's scan reaches a reference position such as at the top of display. The reset signal and the composite blanking signal are used to develop a control signal when the composite blank signal indicates that the tube's scan has reached the character image area. Other circuitry responds to the control signal and the composite blanking signal for addressing a conventional character display circuit. The latter circuit is thus synchronized to output, to the cathode ray tube, data which is imaged within the character image area.

9 Claims, 5 Drawing Figures

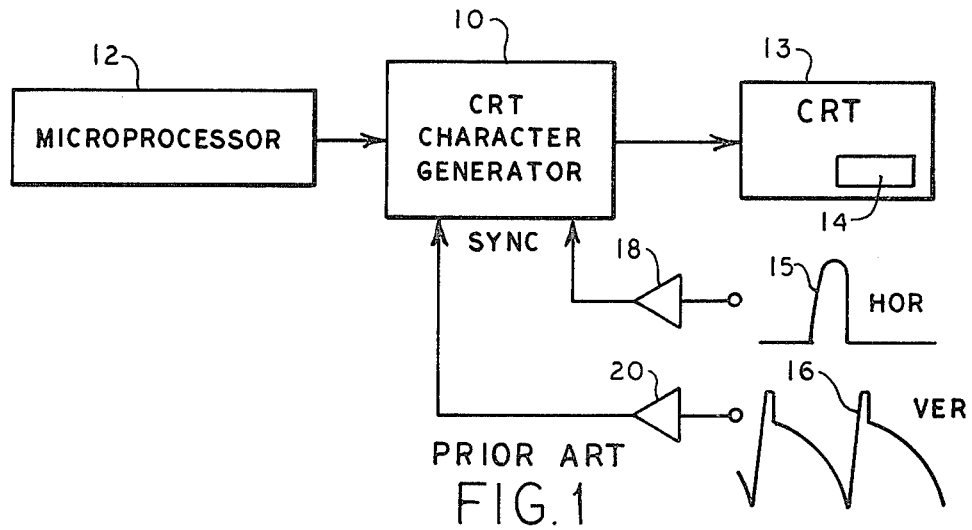
FIG. 1
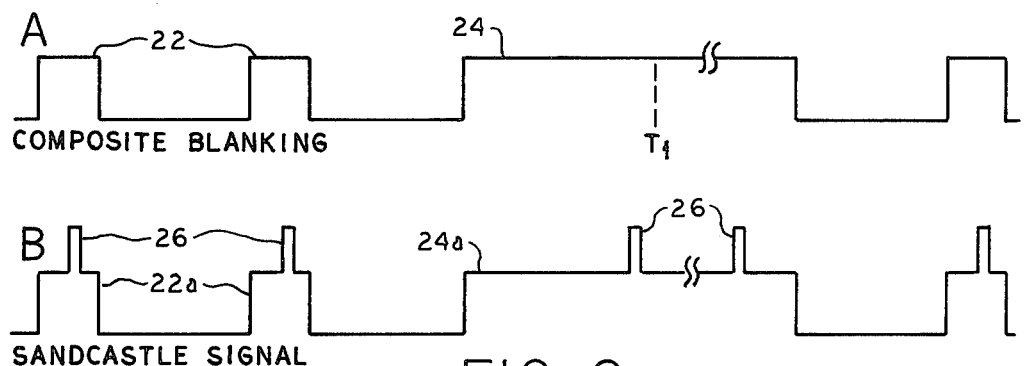
FIG. 2
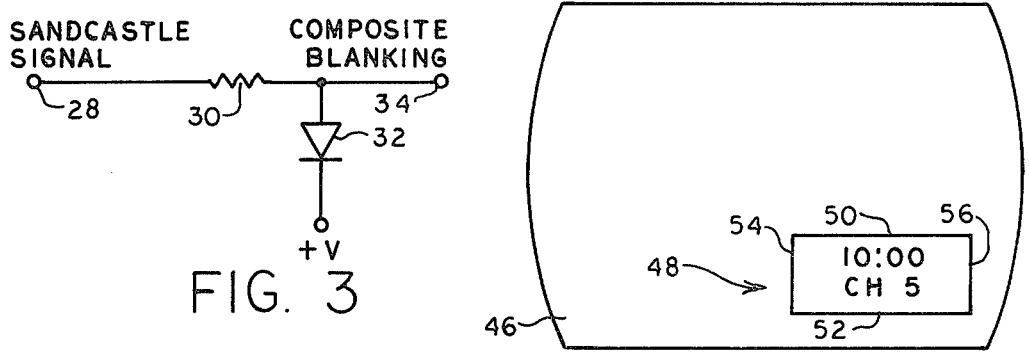
FIG. 3
FIG. 5

SYNCHRONIZING SYSTEM FOR CHARACTER DISPLAY

BACKGROUND OF THE INVENTION

This invention is directed to a system for synchronizing video displays. Cathode ray tube displays of the type which develop images under the control of a character generator are illustrative of the type of displays which may be advantageously synchronized by the present system.

Conventional video displays of the type considered herein form part of a television system in which a CRT (Cathode Ray Tube) is raster scanned in synchronism with horizontal rate and vertical rate sync pulses. Part of the CRT's image is developed by conventional video circuitry while another part thereof may be developed by a character generator. For example, a small part of the CRT's image area (the character image area) may display the time, a channel number, or the like under the control of the character generator. The remainder of the image area will usually display a conventional television image.

In order to properly locate characters or other data in the character image area, a conventional character generator is synchronized by vertical rate and horizontal rate sync pulses. As shown in FIG. 1, for example, a character generator 10, operating under the control of a microprocessor 12, sends data to a CRT 13 for displaying the data in a designated character image area 14. Synchronization of the character generator 10 is provided by horizontal rate pulses 15 and vertical rate pulses 16. These pulses, developed in the television receiver (not shown), typically have an amplitude of 50 to 60 volts. Hence, they are applied to buffers 18 and 20 to limit their voltage excursion to predetermined amplitudes, and then applied as sync inputs to the character generator 10.

Although this type of synchronization of the character generator provides adequate performance characteristics, it has drawbacks in terms of expense. The use of buffers 18 and 20 obviously increases the cost of the system. In addition, since the character generator is normally fabricated as part of an integrated circuit chip, two input pins on the chip must be dedicated to receiving the two sync inputs. Including these two pins merely for synchronization purposes also adds to the expense of the system.

Accordingly, it is a general object of the invention to provide an improved system for synchronizing a video display.

It is a more specific object of the invention to provide a less expensive system for synchronizing the display of data on a raster scanned CRT.

BRIEF DESCRIPTION OF THE FIGURES

The objects stated above and other objects of the invention are set forth more particularly in the following detailed description and in the accompanying drawings, of which:

FIG. 1, previously described, illustrates a conventionally synchronized video display;

FIG. 2 depicts waveforms which illustrate a composite blanking signal of the type utilized as an input to the present synchronization system, and a sandcastle signal from which the composite blanking signal may be derived.

FIG. 3 shows a clipping circuit for converting the sandcastle signal to a composite blanking signal;

FIG. 5 depicts the faceplate of the CRT and a character image area thereon in which characters generated by the character display circuit are imaged.

DESCRIPTION OF THE PREFERRED EMBODIMENT

Figure 4:
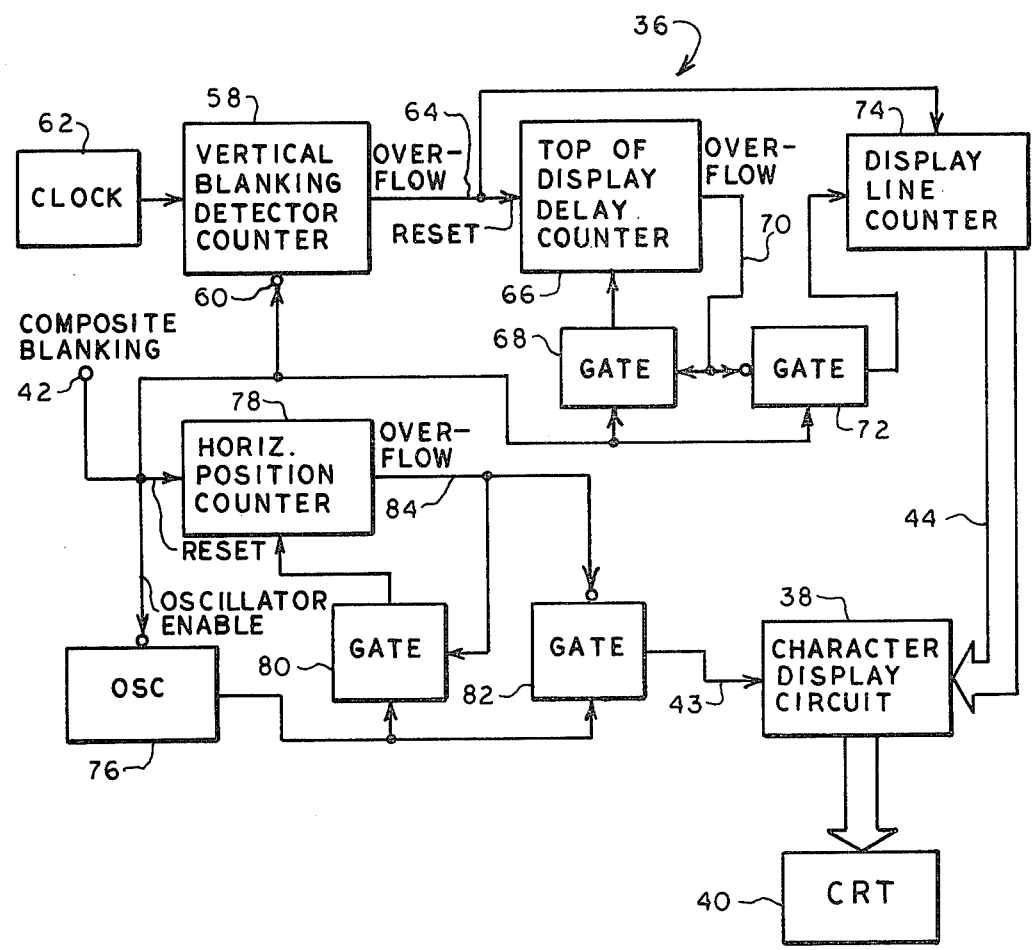
FIG. 4 illustrates a system according to the invention for synchronizing an illustrated character display circuit with the scan of a CRT.

The synchronization system described herein is designed to be included on an integrated circuit chip and to use but a single pin which is dedicated to receiving one synchronizing input signal. As described in more detail below, the synchronizing signal is a composite blanking signal of the type which may be generated conventionally in television receivers. The present system is also advantageously used with television receivers which develop a so-called "sandcastle" signal. The sandcastle signal may be converted to a composite blanking signal and then applied to the synchronizing input of the integrated circuit chip.

Referring to FIG. 2, waveform A thereof illustrates a conventional composite blanking signal which may be generated conventionally or derived from a sandcastle signal. The composite blanking signal includes horizontal rate blanking pulses 22 which are normally used to blank a receiver's CRT during horizontal retrace intervals. A vertical blanking pulse 24 is also part of the composite blanking signal and is normally used to blank the receiver's CRT during the vertical retrace interval. This type of composite blanking signal constitutes the single synchronizing input utilized by the present system.

Waveform B of FIG. 2 illustrates a sandcastle signal which is generated by some television receivers. This signal includes horizontal rate blanking pulses 22a, a vertical blanking pulse 24a, and color burst gate pulses 26. The latter pulses are typically superimposed on the horizontal and vertical rate blanking pulses as shown.

The sandcastle signal is relevant to the present invention only in that it may be converted to a composite blanking pulse. A more detailed description of the sandcastle signal and a manner of generating it are described in U.S. Pat. No. 4,263,610.

To convert the sandcastle signal to a composite blanking signal, the clipping circuit shown in FIG. 3 may be used. This circuit includes an input 28 for receiving the sandcastle signal, a resistor 30, and a diode 32 coupled between a voltage source (+V) and an output 34. The voltage source may be selected to clip the color burst gate pulses 26 from the sandcastle signal so that a composite blanking signal such as shown in FIG. 2 is developed at the output 34.

Referring now to FIG. 4, a system 36 is shown for synchronizing the operation of a conventional character display circuit 38 with the scan of a CRT 40 which is blanked by a composite blanking signal. In general, the system 36 receives a composite blanking signal (such as waveform A of FIG. 2) at an input 42 and develops output signals on leads 43 and 44 for addressing the character display circuit 38 such that characters output by the circuit 38 are displayed within the boundaries of a designated character image area on the CRT 40.

Referring briefly to FIG. 5, the faceplate 46 of CRT 40 is shown as including a character image area 48 in which data generated by the character display circuit is imaged. By virtue of the signals input to the character display circuit via lead 44 (FIG. 4), the data is imaged within the vertical boundaries 50 and 52 of the area 48. The signals applied to the character display circuit via lead 43 cause the data to be imaged within horizontal boundaries 54 and 56. The CRT's display area which lies outside the boundaries of the imaging area 48 may include video developed conventionally in response to a broadcast television signal or any other suitable signal source.

Returning to FIG. 4, the system 36 includes means responsive to the composite blanking signal on lead 42 for generating a reset signal when the composite blanking signal is indicative of the CRT's raster scan being at a reference position on the CRT. Preferably, this reference position is at or near the top of display on the CRT's faceplate.

In the illustrated embodiment, such a reset signal is developed by a counter 58 which is designated as a vertical blanking detector counter. This counter receives an enabling composite blanking signal at its input 60 and receives clock pulses developed by a clock generator 62. The clock generator 62 may develop clock pulses whose frequency may be several tens of kilohertz.

In operation, the counter 58 is enabled by each horizontal and vertical rate blanking pulse in the composite blanking signal for counting clock pulses from the clock generator 62. The counter 58 is reset when the composite blanking signal is at a low level (between blanking pulses). The maximum count which the counter 58 may reach before overflowing is selected to be greater than any count attainable during any horizontal rate blanking pulse such as the pulse 22 (FIG. 2). Thus, the counter begins counting anew when a horizontal rate blanking pulse 22 occurs and continues counting, without overflowing, until the termination of that pulse. When the vertical retrace interval begins, the counter 58 is enabled by the vertical rate blanking pulse 24. Because the pulse 24 has a much longer duration than the pulses 22, the counter 58 continues counting for a longer time. To develop a properly timed reset signal, the counter 58 is selected to reach its maximum count, overflow, and develop a reset signal on lead 64 during the vertical retrace interval. For example, the counter 58 may overflow at the time indicated as $T_1$ in FIG. 2. Hence, a reset signal is generated each time the CRT's scan is at its reference top of display position.

The reset signal appearing on lead 64 is applied to a top of display delay counter 66 which also receives the composite blanking signal through a gate 68. In general, the counter 66 responds to the reset signal and the composite blanking signal for generating a control signal when the composite blanking signal is indicative of the CRT's raster scan being at the character imaging area 48 (FIG. 5). Specifically, when the counter 66 is reset by the signal on lead 64, it begins counting blanking pulses received from the gate 68. The count which causes the counter 66 to overflow is equal to the number of horizontal blanking pulses (or scan lines) which occur between the end of the vertical blanking interval (the end of pulse 24 in FIG. 2) and the top boundary 50 of the character imaging area. When that overflow count is reached, the counter 66 develops a control signal on lead 70 for disabling the gate 68 and enabling a second gate 72. Thus, the gate 68 now decouples the composite blanking signal from the counter 66 to hold it in an overflow state.

The gate 72 and a display line counter 74 operate to address the character display circuit 38 so that characters which are imaged on the CRT are within the vertical boundaries of the character image area 48. Toward this end, the display line counter is reset by the reset signal developed as a result of the counter 58 reaching an overflow condition. Having been reset, the counter begins counting blanking pulses in the composite blanking signal when the gate 72 becomes enabled by the control signal on lead 70. Thus, the counter 74 begins counting when the CRT's scan reaches the upper boundary of the character imaging area 48. As the CRT's scan proceeds through the character imaging area, the counter 74 is incremented. That count is applied as an address input to the character display circuit 38 so that its output is synchronized with the CRT's scan through the character imaging area.

Also included in the system 36 are an oscillator 76, a horizontal position counter 78, and gates 80 and 82. These components serve to generate a gated dot clock signal on the lead 43. In response to this clock signal, the character display circuit 38 causes its data to be output to the CRT so that imaged characters are within the horizontal boundaries of the character imaging area.

The oscillator 76 may start outputting pulses whose phase is synchronized by the composite blanking signal and whose frequency may be 3.2 megahertz, for example. Those pulses are coupled through the gate 80 to the counter 78 where they are counted. The composite blanking signal is also coupled to the counter 78 for resetting this counter upon the occurrence of each blanking pulse. In addition, the counter 78 is selected to overflow when its count is indicative of the CRT's raster scan arriving at the boundary 54 of the character imaging area 48.

The overflow signal at the output 84 of the counter 78 is coupled to the gate 80 to disable it and thereby decouple the oscillator pulses from the counter. The same overflow signal is coupled to the gate 82 to enable it whereby oscillator pulses, constituting a gated dot clock signal, are coupled via the gate 82 to the output lead 43. Thus, the character display circuit 38 is addressed by the signals on leads 43 and 44 so that the data output to the CRT is displayed within the character image area.

As previously mentioned, the system 36 may be fabricated as part of an integrated circuit chip which may include the character display circuit 38 and, if desired, other circuits as well. Because the synchronizing system employs only the composite blanking signal as a chip input, only one pin is needed to synchronize the system with the scan of the CRT.

In construction, all of the illustrated counters may be conventional. Counters 58, 66 and 78 need merely be programmed to overflow at appropriate counts as described above. The various gates may also be of conventional construction.

Although the synchronization system has been described with reference to a preferred construction, it will be obvious to those skilled in the art that many alterations and modifications may be made without departing from the invention. Accordingly, it is intended that all such alterations and modifications be considered as within the spirit and scope of the invention as defined by the appended claims.

What is claimed is:

1. For use with a television receiver which develops a composite blanking signal having horizontal rate and vertical rate blanking pulses, and a character display circuit which generates data for the display of characters on a raster scanned cathode ray tube, a system for synchronizing the operation of the character display circuit so that data therefrom is imaged within a designated character image area on the cathode ray tube, comprising:
   means responsive to the composite blanking signal for generating a reset signal when the composite blanking signal is indicative of the raster scan being at a reference position on the cathode ray tube;
   means receiving the composite blanking signal and the reset signal for generating a control signal when the composite blanking signal is indicative of the raster scan being at the character image area on the cathode ray tube;
   means responsive to the control signal and the composite blanking signal for addressing the character display circuit so that characters which are imaged on the cathode ray tube are within the vertical boundaries of the character image area; and
   means responsive to the composite blanking signal for generating and applying to the character display circuit a gated dot clock signal so as to synchronize character generation with the horizontal boundaries of the character image area.

2. A system as set forth in claim 1 wherein said means for generating the reset signal includes a clock for generating clock pulses and a counter for counting the clock pulses, said counter being enabled by each blanking pulse in the composite blanking signal such that the counter counts to an overflow condition and generates the reset signal only during a vertical blanking interval, whereby the reset signal is generated when the cathode ray tube's scan is at a top of display reference position.

3. A system as set forth in claim 1 wherein said means for generating the control signal includes a counter for counting horizontal rate blanking pulses in the composite blanking signal and adapted to be reset by said reset signal.

4. A system as set forth in claim 3 wherein an upper boundary of the character imaging area is defined by a predetermined number of scan lines following a vertical blanking interval, and wherein said counter is adapted to overflow and generate the control signal upon counting the same predetermined number of horizontal rate blanking pulses.

5. A system as set forth in claim 1 wherein said means for addressing the character display circuit includes a counter for counting horizontal rate blanking pulses in the composite blanking signal and a gate which responds to the control signal for steering the blanking pulses to the counter, whereby the count in the counter is incremented in synchronism with the cathode ray tube's scan of the character image area so that said count may address the character display circuit.

6. A system as set forth in claim 1 wherein said means for generating the gated dot clock signal includes an oscillator, a counter for counting oscillator pulses and adapted to be reset by the composite blanking signal and to count to an overflow condition when its count is indicative of the cathode ray tube's scan reaching a horizontal boundary of the character imaging area, and a gate responsive to said overflow condition for steering oscillator pulses to the character display circuit, whereby the steered oscillator pulses correspond to the gated dot clock signal.

7. A system as set forth in claim 6 including a second gate for coupling the oscillator pulses to the counter, said second gate being responsive to the counter's overflow condition for decoupling the oscillator pulses from the counter.

8. For use with a television receiver which develops a sandcastle signal, and a character display circuit which generates data for the display of the characters on a raster scanned cathode ray tube, a system for synchronizing the operation of the character display circuit so that data therefrom is imaged within a designated character image area on the cathode ray tube, comprising:
   means for converting the sandcastle signal to a composite blanking signal having horizontal rate and vertical rate blanking pulses;
   means for generating clock pulses;
   a first counter for counting the clock pulses and adapted to be enabled by the composite blanking signal so as to generate a reset signal when the counter's count is indicative of the raster scan being at a reference position on the cathode ray tube;
   a second counter for counting the horizontal rate blanking pulses in the composite blanking signal and being responsive to the reset signal for generating a control signal when the second counter's count is indicative of the raster scan being at the character image area on the cathode ray tube; and
   means responsive to the control signal and the composite blanking signal for addressing the character display circuit so that characters which are imaged on the cathode ray tube are within the vertical boundaries of the character image area.

9. For use with a television receiver which develops a composite blanking signal having horizontal rate and vertical rate blanking pulses, and a character display circuit which generates data for the display of characters on a raster scanned cathode ray tube, a system for synchronizing the operation of the character display circuit so that data therefrom is imaged within a designated character image area on the cathode ray tube, comprising:
   means for generating clock pulses;
   a first counter for counting the clock pulses and adapted to be enabled by the composite blanking signal so that the counter reaches an overflow condition and generates a reset signal only during the receiver's vertical blanking interval, whereby the reset signal is generated when the cathode ray tube's scan is in a top of display condition;
   a second counter for counting blanking pulses in the composite blanking signal and adapted to be reset by the reset signal, said second counter being selected to overflow and develop a control signal when its count is indicative of the raster scan being at the character image area on the cathode ray tube;
   a first gate for coupling the composite blanking signal to the second counter and for decoupling the composite blanking signal from the second counter in response to the control signal;
   a third counter for counting horizontal rate blanking pulses in the composite blanking signal and for addressing the character display circuit in accordance with its count;
   a second gate responsive to the control signal for coupling the composite blanking signal to the third counter; and
   means including an oscillator for addressing the character display circuit in synchronism with the raster scan reaching a horizontal boundary of the character image area.

* * * * *